(12) United States Patent
Aue (10) Patent No.: US 8,279,943 B2
(45) Date of Patent: Oct. 2, 2012

(54) METHOD FOR RECEPTION OF DVB-H SIGNALS AND DVB-H RECEIVER

(75) Inventor: Volker Aue, Dresden (DE)

(73) Assignee: Entropic Communications, Inc., San Diego, CA (US)

( * ) Notice: Subject to any disclaimer, the term of this patent is extended or adjusted under 35 U.S.C. 154(b) by 1201 days.

(21) Appl. No.: 11/995,984

(22) PCT Filed: Jul. 10, 2006

(86) PCT No.: PCT/IB2006/052321
§ 371 (c)(1),
(2), (4) Date: Jan. 17, 2008

(87) PCT Pub. No.: WO2007/010431
PCT Pub. Date: Jan. 25, 2007

(65) Prior Publication Data
US 2008/0212688 A1 Sep. 4, 2008

(30) Foreign Application Priority Data
Jul. 20, 2005 (EP) ..................................... 05015749

(51) Int. Cl.
*H04J 11/00* (2006.01)
*H04L 27/06* (2006.01)
*H03K 9/00* (2006.01)
(52) U.S. Cl. .................................................. 375/240.26
(58) Field of Classification Search .......... 370/389–466; 375/260–316, 344–350; 348/14, 1–4; 725/62–89, 725/134–142; 455/403–343, 343–403
See application file for complete search history.

(56) References Cited

U.S. PATENT DOCUMENTS
6,963,736 B2 * 11/2005 Tahtinen .................... 455/343.1
(Continued)

FOREIGN PATENT DOCUMENTS
DE 19953184 A1 6/2000
(Continued)

OTHER PUBLICATIONS
Bo Ai, et al.; "On the Synchronization Techniques for Wireless OFDM Systems"; IEEE transactions on broadcasting, vol. 52, No. 2, Jun. 2006.

*Primary Examiner* — Man Phan (57) ABSTRACT

A method for reception of DVB-H signals wherein a MPEG transport stream is grouped into packets belonging to a certain IP data stream and forming bursts in time slices, the MPEG-TS is modulated into OFDM symbols, these symbols are grouped in frames, the frames themselves are grouped in superframes and symbols, frames and superframes are provided with numbers, whereas a transmitter does not change the transmission parameters (FFT mode, guard interval, code rate, modulation format) between successive bursts and a receiver is notified about a relative time from a first burst to transmission of the next burst and the receiver is switched off between the first and the next burst comprising: accurately calculating the receive time of the next burst from the DVBH delta-t time received in the first burst; setting a wake up timer and powering down the receiver; powering up the receiver for reception of the next burst exactly at the superframe boundary; executing signal acquisition; calculating the symbol number and frame number of the first symbol that contains relevant data to be modulated within the actual superframe; calculation the number of bis to be discarded from the MPEG-TS to align with a boundary of a MPEG-TS-packet; discarding the bits; and starting demodulation at the boundary of the MPEG-TS-packet.

10 Claims, 4 Drawing Sheets

U.S. PATENT DOCUMENTS

| | | | |
|---|---|---|---|
| 7,409,009 B2* | 8/2008 | Akhtman | 375/296 |
| 7,463,699 B2* | 12/2008 | Zhang et al. | 375/316 |
| 7,477,872 B2* | 1/2009 | Fujii | 455/3.01 |
| 7,751,515 B2* | 7/2010 | Schwoerer et al. | 375/354 |
| 2005/0105659 A1* | 5/2005 | Sheu et al. | 375/360 |
| 2005/0213680 A1* | 9/2005 | Atungsiri et al. | 375/260 |
| 2006/0153317 A1* | 7/2006 | Zhang et al. | 375/344 |
| 2007/0002851 A1* | 1/2007 | Paila et al. | 370/389 |
| 2007/0064588 A1* | 3/2007 | Kisoda et al. | 370/208 |
| 2007/0126857 A1* | 6/2007 | Turtinen | 348/14.01 |
| 2007/0130610 A1* | 6/2007 | Aarnio et al. | 725/134 |
| 2008/0304587 A1* | 12/2008 | Setoh et al. | 375/260 |

FOREIGN PATENT DOCUMENTS

| | | |
|---|---|---|
| EP | 1253721 A2 | 10/2002 |
| EP | 1608094 A1 | 12/2005 |
| GB | 2345831 A | 7/2000 |
| GB | 2401759 A | 11/2004 |
| WO | 2004082181 A1 | 9/2004 |

\* cited by examiner

METHOD FOR RECEPTION OF DVB-H SIGNALS AND DVB-H RECEIVER

CROSS REFERENCE TO RELATED APPLICATIONS

This application is a US national stage entry of, and claims priority under 35 U.S.C. 371 to PCT/IB2006/052321 filed on Jul. 10, 2006, which in turn claims priority from EP05015749.4 filed on 20 Jul. 2005.

BACKGROUND

The invention relates to a Method for reception of DVB-H signals wherein a MPEG transport stream (MPEG-TS) is grouped into packets belonging to a certain IP data stream and forming bursts in time slices, the MPEG-TS is modulated into OFDM symbols, these symbols are grouped in frames, the frames themselves are grouped in superframes and symbols, frames and superframes are provided with numbers. The invention is basing on the assumption that a transmitter does not change the transmission parameters (FFT mode, guard interval, code rate, modulation format) between successive bursts. A receiver is notified about a relative time from a first burst to transmission of the next burst and the receiver is switched off between the first and the next burst.

The invention further relates to a DVB-H receiver consisting of a RF module, a DVB-T baseband receiver, an analog-to-digital converter, a clock and a protocol processor.

DVB-H is the most promising standard for bringing digital television (TV) to mobile handheld devices. DVB-H is based on the existing DVB-T standard and the IP datacasting mode thereof, where the benefit for mobile devices comes from intelligently grouping MPEG transport stream (TS) packets (the interface to the physical layer).

Conventional DVB-T receivers are designed for continuous reception of DVB-T streams. A relatively long time can be tolerated for signal acquisition, i.e., (1) identifying the presence of a DVB-T signal, then
(2) identifying the mode (2 k or 8 k FFT size and the duration of the guard interval),
(3) achieving time and frequency synchronizations,
(4) achieving frame synchronization and obtaining a first estimate of the channel.

Only after full synchronization (steps 1-4) is achieved, the demodulation of the received signal can start.

The DVB-T frame is organized as follows:

68 symbols form a so called frame. The symbols are numbered increasingly starting with the beginning of a frame.

4 frames are grouped to form a super frame. The frame number is signaled in the transmission parameter signaling (TPS) symbols which are multiplexed into the OFDM symbols.

Frame synchronization is important for several reasons.

The interleaver patterns change from even to odd symbol numbers.

The positions of the scattered pilots depend on the symbol number modulo 4. The scattered pilot positions also affect the location of the data carriers in the OFDM symbol.

The DVB-T standard guarantees an integer multiple of MPEG transport stream packets (TS) to be contained in a super frame. For the channel decoding logic, it is essential that the received data are aligned accordingly, i.e., the MPEG-TS packet boundaries are known.

The conventional DVB-T receiver first establishes frame synchronization, then waits for the beginning of a super frame, and then starts pushing demodulated data through the channel decoding logic.

SUMMARY

In DVB-H, the greatest advantage for a mobile handheld device comes from grouping MPEG-TS packets that belong to a certain IP data stream. The packets are grouped consecutively to form bursts. So called time slicing information is included in every burst to notify the receiver about the relative time (from the current burst) to the transmission of the next burst. The receiver then can set an appropriate timer and switch off the receiver thereby reducing its on time by more than 90% and hence saving a great deal of power consumption.

In DVB-H, for burst reception, where the receiver is switched off between receipt of bursts, full signal acquisition is required with every reception of a burst. Since the time-slicing mechanism in DVB-H is established on the link layer, i.e. on the MPEG-TS layer, no alignment of relevant MPEG-TS with respect to super frame boundaries can be assumed.

A delta-t-time is the time difference from one time slice to the next. The delta-t-time is transmitted by a pointer within the MPEG-TS. The delta-t-time information is used to switch off the receiver or to switch the receiver into a sleep-mode for reducing power consumption of the receiver.

After the delta-t-time the receiver is switched on for reception of the next time slice. Because the lack of alignment the receiver is switched on some time before the awaited next slice for save reception. Thereafter it is necessary to find the super frame boundary. Often the time for searching a super frame boundary is as long as the actual information. This causes an increased power consumption. Furthermore, since most of the receiver power consumption is burned in the RF front-end and baseband signal processor, the relative reduction in on-time almost directly translates into the same relative reduction of power consumption.

Currently, a strong interest from the market is seen to equip mobile cellular platforms also with DVB-H. The power reserve in all mobile receivers is limited.

The problem to be solved is to reduce the power consumption of DVB-H receivers by reducing the switch on time of the receiver.

The problem is solved by a method with the features of claim 1. Claims 2 to 4 show preferred embodiments of the method.

The problem is further solved by a DVB-H receiver with the features of claim 5. Further embodiments are claimed in claims 6 to 9.

The invention removes the problem of waiting for a super frame boundary for aligning bits of the inner channel decoder with the outer decoder. Acquisition time up to the super frame duration (68×4 symbols) with an average duration of one half the super frame duration can be saved at the receiver that makes use of the invention.

Note that the symbol duration (8 k FFT mode, 8 MHz) can easily be at the order of 1 ms, making the average waiting time for hitting a super frame boundary to be above 2×68+34 OFDM symbol durations.

For the invention to work, it needs to be assumed that the transmitter does not change the transmission parameters (FFT mode, guard interval, code rate, modulation format) between successive bursts. Albeit the DVB-T standard theoretically allows such a change, all practical implementations and deployments refrain from making use of this feature. In fact, the mobile and portable DVB-T radio access interface specification, given by the European industry association EICTA, explicitly states that this assumption is valid, and does not require receivers to maintain reception in case the transmitter changes its signaling.

The receiver must have an accurate standby clock or a mechanism to maintain course symbol timing (within the symbol duration). Assuming a period of 5 seconds between bursts, and a symbol duration of 250 μs (2 k FFT mode), the accuracy of the sleep clock must be better than 25 ppm. If such an accuracy cannot be provided by the crystal, some mechanisms such as tracking of the sleep clock from the exact timings estimated after wake-ups, can be used. Thereby the protocol processor accurately calculates the receive time of the next burst from the DVB-H delta-t time received in the present burst.

The DVB-T receiver allows for skipping certain steps of in the acquisition process. In particular, the receiver must have the ability to skip
- Detection of the channel bandwidth (8, 7, 6, or 5 MHz)
- Detection of the guard interval duration
- Detection of the FFT mode (8 k, 4 k, or 2 k)
- Detection of the modulation format (QPSK, 16-QAM, or 64 QAM)
- Detection of the code rate
- Detection of hierarchical transmission
- Detection of the frame and super frame boundaries The receiver may have the ability to support the additional modes defined for DVB-H (4 k mode, indepth interleaver).

The DVB-T receiver has the ability to discard an arbitrary number (0 . . . 8×204−1) of bits after the convolutional decoder (inner decoder) before grouping bits to bytes and passing them to the outer decoder.

The protocol processor calculates the number of bits to be discarded after the convolutional decoder for the next burst from the frame number of the first symbol to be fed forward to the channel decoder and the symbol number (calculated from the precision sleep clock and the delta-t time) of this first symbol.

From the received delta-t time of the present burst, the protocol processor must calculate the time for the first symbol of the next burst to be fed to the channel decoding logic that ensures that all MPEG-TS packets that need to be decoded will successfully be descrambled. The first symbol depends on the delta-t jitter introduced by the IP encapsulator at the transmitter and the transmitter mode that determines the number of MPEG-TS packets per OFDM symbol. Note that the first 18 Reed-Solomon packets of a burst may not be used due to the latencies introduced by the outer interleaver and the derandomizer to establish synchronization on the scrambled MPEG-TS stream.

In a further embodiment of the invention the local timer is adjusted according to the time recovered from the received signal.

The receiver further has preferably the ability to start demodulation at a timing instant given by the protocol processor.

In another embodiment the protocol processor calculates the timing instance for demodulation start and/or acquisition or synchronisation start and the number of bits to be discarded.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
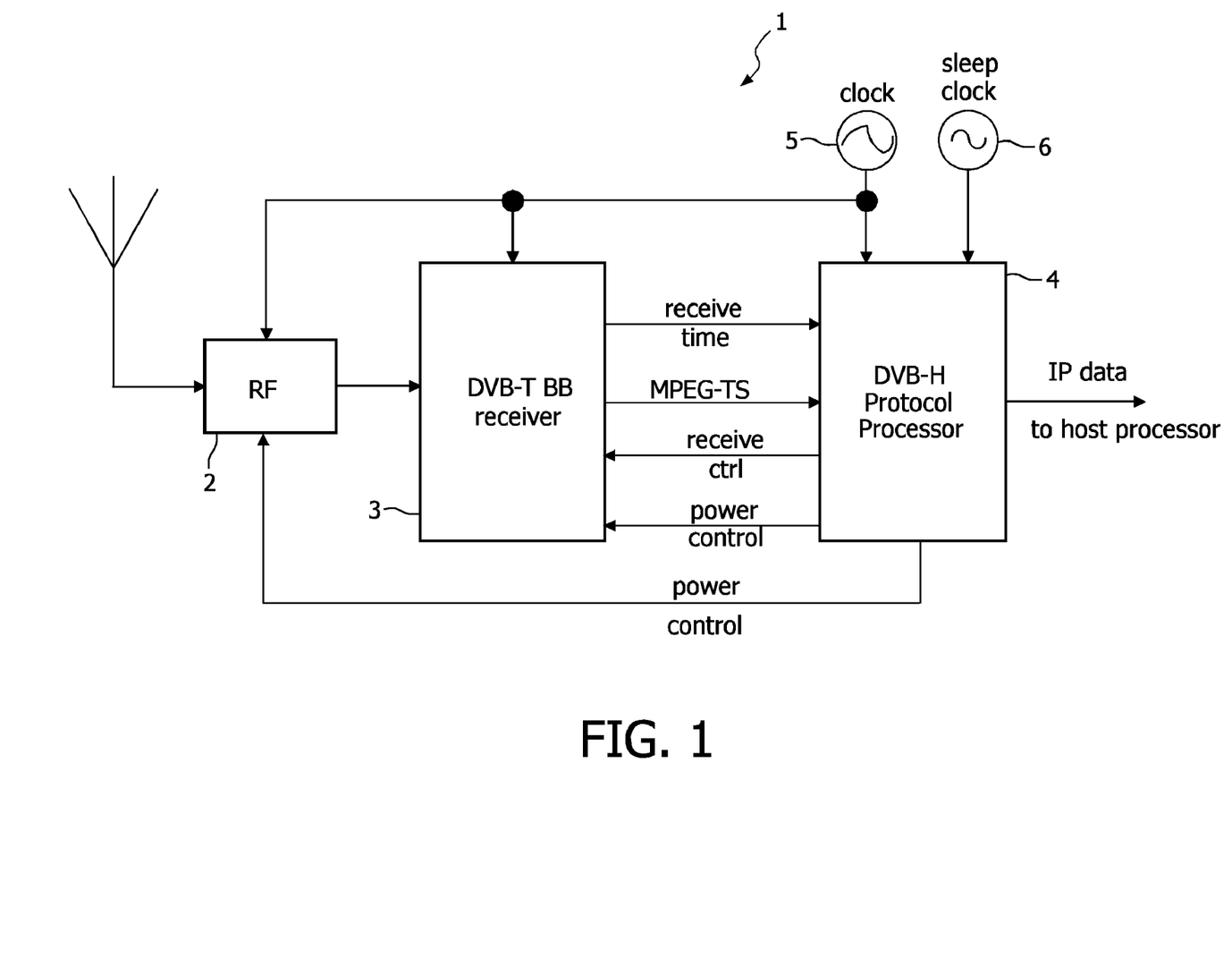
FIG. 1 is an illustration of a scheme of a DVB-H receiver.

The receiver 1 shown in FIG. 1 consists of an RF module 2 that converts a received signal from transmit frequency to IF or baseband (BB). The converted signal is passed to the DVB-T baseband receiver 3 that further processes the signal. The analog-to-digital converters necessary for digitally processing the signal can be either included in the RF part of the DVB-T baseband receiver 3.

The DVB-T baseband receiver 3 is responsible for signal acquisition and demodulation and passes demodulated and descrambled Reed-Solomon packets (MPEG-TS packets) to the DVB-H protocol processor 4. A clock 5 is provided to all components shown in this subsystem. Furthermore, a sleep clock 6 is provided to the protocol processor 4.

The protocol processor 4 assembles the following features:
- MPEG-TS filtering
- DVB-H time-slice control
- DVB-H IP decapsulation
- System standby and power down control (to RF and DVB-T receiver)
- Receive control to DVB-T receiver 3
- Interface to host processor The DVB-T receiver 3 has the following features:
- Ability to skip
- Detection of the channel bandwidth (8, 7, 6, or 5 MHz)
- Detection of the guard interval Detection of the FFT mode (8 k, 4 k, or 2 k)
- Detection of the modulation format (QPSK, 16-QAM, or 64 QAM)
- Detection of the code rate
- Detection of hierarchical transmission
- Detection of the frame and super frame boundaries
- The receiver 3 may have the ability to support the additional modes defined for DVB-H (4 k mode, indepth interleaver)
- The DVB-T baseband 3 receiver has the ability to discard an arbitrary number (0 . . . 8×204−1) of bits after the convolutional decoder (inner decoder) before grouping bits to bytes and passing them to the outer decoder.
- The DVB-T baseband receiver 3 conveys a time stamp of the first symbol passed to the channel decoder to the protocol processor.
- In full acquisition mode, the protocol processor 4 must also know the symbol number and frame number of the first symbol that has been passed to the channel decoder 7.
- The baseband receiver 3 also forwards the determined signal parameters such as (FFT mode, hierarchical modulation, code rate, modulation format, etc.) to the protocol processor 4.

Figure 2:
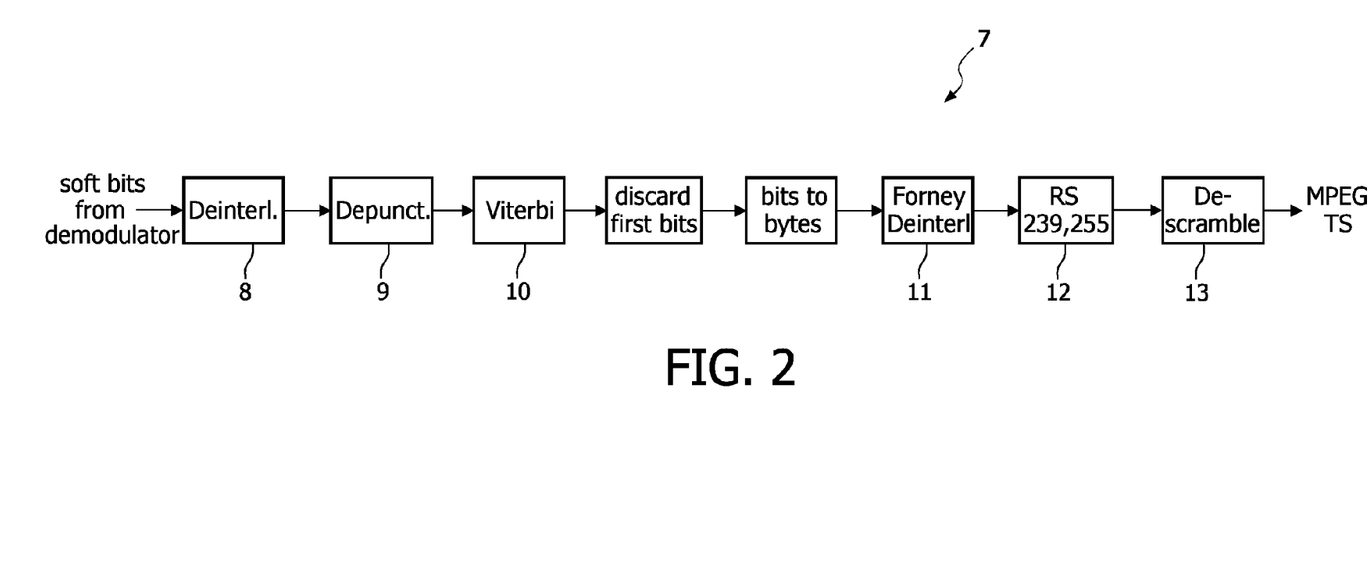
FIG. 2 is an illustration of a block diagram of channel decoding logic in the DVB-H receiver.

A block diagram of the channel decoding logic 7 of the DVB-T baseband receiver 3 is shown in FIG. 2.

The channel decoding logic 7 takes (soft) bits from the demodulator and passes them through the deinterleaver 8 that performs symbol and bit deinterleaving according to DVB-T/H standard. The depuncturer block 9 takes the deinterleaved data and inserts the depuncture information according to the determined code rate. The depunctured (soft) bits are then fed forward to the convolutional deinterleaver 10 which typically is a Viterbi kind of processor. This first bits of each burst are then discarded as described in this invention disclosure before grouping the bits to bytes and passing them on to the outer deinterleaver 11 (Forney deinterleaver), the Reed Solomon decoder 12 and the descrambler 13. The outputs of the descrambler 13 are the MPEG-TS packets.

The protocol processor 4 sends the following information in the receive control commands to the baseband receiver 3:

Request to receive at a certain time

Request to omit certain stages in the acquisition

Depending on if the baseband receiver 3 contains a memory of the determined signal parameters, the modulation parameters (FFT mode, hierarchical modulation, code rate, modulation format, etc.)

For the subsystem making use of the invention, the receive procedure is as follows.

At first, the receiver 3 establishes DVB-T synchronization using standard DVB-T procedures, i.e., a channel is searched for the presence of a DVB-T/H signal. If the DVB-T/H signal is present, the DVB-T/H signaling is determined. The determined signal parameters are fed forward to the protocol processor 4.

The protocol processor 4 establishes DVB-H synchronization on the DVB-T MPEG-TS stream. The time for receiving the next burst is calculated. A wake-up timer is set and the system is powered down.

For the reception of the next burst, the system is powered up before. The protocol processor 4 has calculated the symbol number and frame number of the first symbol the baseband processor 3 demodulates and forwards the received data to the channel decoding logic. The protocol processor 4 in particular calculates how many bits that will come out of the convolutional decoder 10 initially need to be discarded. Exactly as many bits need to be discarded as to align with the boundary of a Reed-Solomon packet. The baseband receiver 3 is timely requested to only perform fine time and frequency synchronizations and channel estimation all within a known fixed time period, but not to determine the transmission parameters again. Then, the receiver 1 shall start demodulation timely right away with the parameters (besides previously determined transmission parameters, the frame number, symbol number, and first bits to be discarded after convolutional decoding) given from the protocol processor 4.

An alternative implementation first groups the bits to bytes and then discards the first bytes of each received burst. As a merit, for certain modes, the receiver must start demodulation already one or two symbols earlier than it would need, if the baseband receiver 3 uses a logic as shown in FIG. 2.

Figure 3:
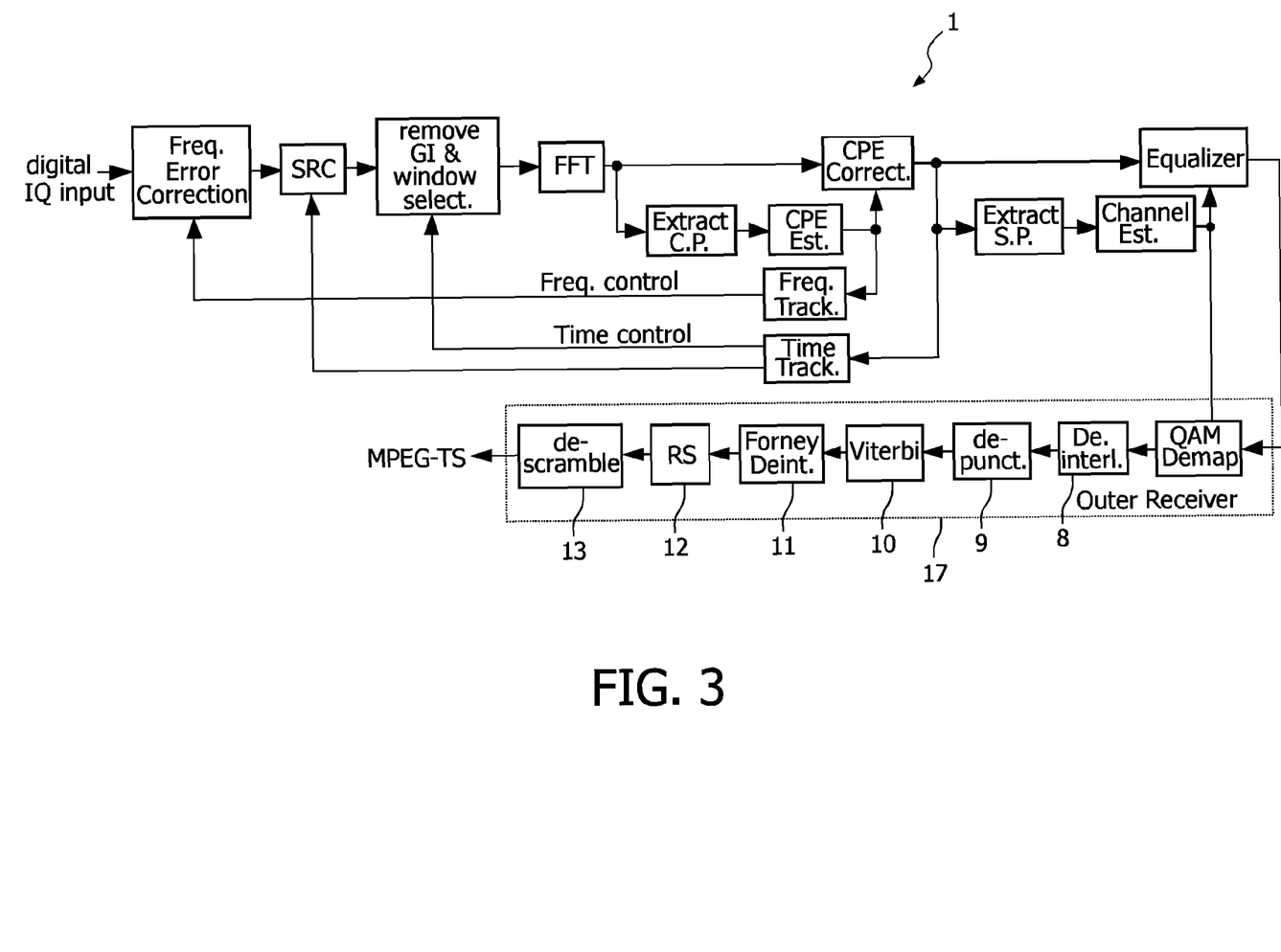
FIG. 3 is a block diagram of the DVB-H-receiver.

FIG. 3 shows the block diagram of a typical DVB-T/H receiver 1. For simplicity, the circuitry for pre-FTT based acquisition is not shown. The digital IQ input that is provided by the analog-front-end, an analog-to-digital-converter (ADC), and additional digital filter circuitry, is further frequency error corrected often by controlling a digital frequency shifter. The corrected signal is then fed through a sample-rate-converter (SRC) 14 that can correct for sampling frequency offset between the transmitter and the receiver ADC(s). The SRC 14 may optionally include additional decimation and low-pass filtering. After correction of frequency and sample frequency clock offsets, for each symbol, a vector of FFT size samples is selected and the guard interval is removed. On this vector, the FFT is performed. Depending on the receiver implementation, residual common phase error (CPE) needs to be removed. Typically, the continuous pilots are extracted from the multiplex and are used for estimating the CPE from which an adequate estimate is obtained. This estimate is then used to correct the CPE at the output of the FFT 15. The estimate can further be used for tracking any residual frequency offset in a frequency tracking circuit to control the frequency offset correction block. For successive processing, the impairments added by the channel must be removed from the CPE corrected symbol by means of an equalizer. An estimate of the channel transfer function (CTF) is obtained from a channel estimator 16 by using the scattered pilots extracted from the multiplex. Typically, the channel estimate is obtained by means of interpolation the channel from the scattered pilots based estimates in time- and frequency domain. The corrected OFDM symbol and the estimated CTF are then transferred to the outer receiver 17. The outer receiver 17 then performs symbol demapping, symbol and bit deinterleaving, depuncturing, convolutional decoding typically by the means of a Viterbi processor 10, outer (Forney) deinterleaving 11, Reed-Solomon decoding 12, and finally derandomizing (descrambling) 13 to deliver an MPEG transport stream (MPEG-TS).

Figure 4:
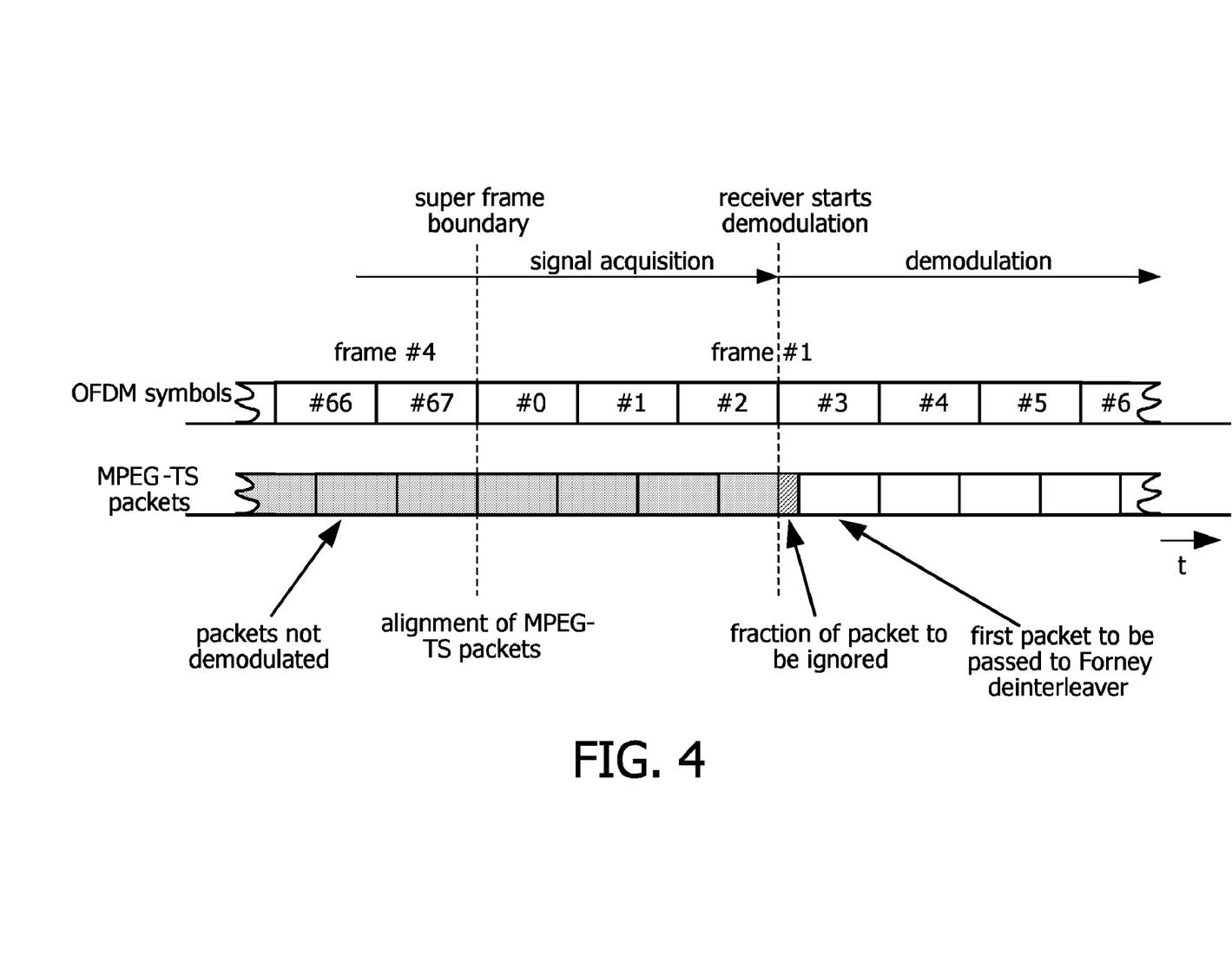
FIG. 4 an illustration showing the timing relationship between OFDM symbols an MEPG-TS packages.

FIG. 4 shows the timing relationship between OFDM symbols and MPEG-TS packets. MPEG-TS packets are aligned at the super frame boundary, i.e., the first bit of the first symbol after the super frame boundary is guaranteed to be the first bit of an MPEG-TS packet. Afterwards, symbols and MPEG-TS packets are typically unaligned. In the example above, more than one MPEG-TS packet fit into one OFDM symbol. If, e.g., the receiver starts demodulation with symbol #3, the symbol #3 fraction of the packet that crosses the boundary between symbol #2 and #3 needs to be ignored. The first complete packet is passed to the Forney deinterleaver 11.

Since the MPEG-TS packets are of fixed size, the number of bits to be ignored can be easily calculated from the symbol number, and the number of data bits contained in one symbol. In DVB-T/H, the size of an MPEG-TS packet before RS decoding is 204 bytes equivalent to 1632 bits.

The number of bits contained in the fraction of the overlapping MPEG-TS packet in the OFDM symbol that is preceding the first OFDM symbol being demodulated is the remainder of the integer division of the bits contained in all the symbols between the last super frame boundary and the demodulation start, and the number of bits contained in one MPEG-TS packet. Thus, the amount of bits contained in the overlapping packet in the first symbol being demodulated is the difference between the number of bits contained in one MPEG-TS packet and the remainder of the previous calculation. The number of bits contained in all the symbols between the last super frame boundary and the demodulation start, is the product of the frame number of the frame where the demodulation starts minus one and the number of symbols per frame (68) plus the symbol number of the first symbol being demodulated.

NUMBER_OF_BITS_TO_BE_IGNORED=204×8−
REM(DATA_BITS_PER_SYMBOL×(SYMBOL_NUMBER+(FRAME_NUMBER−1)×68),
204×8),

The number of data bits per symbol is mode dependent and can be obtained from table lookup.

TABLE 1 number of data bits per mode contained in one OFDM symbol

| Code Rate | QPSK | | | 16-QAM | | | 64-QAM | | |
|---|---|---|---|---|---|---|---|---|---|
| | 2k mode | 4k mode | 8k mode | 2k mode | 4k mode | 8k mode | 2k mode | 4k mode | 8k mode |
| 1/2 | 1512 | 3024 | 6048 | 3024 | 6048 | 12096 | 4536 | 9072 | 18144 |
| 2/3 | 2016 | 4032 | 8064 | 4032 | 8064 | 16128 | 6048 | 12096 | 24192 |
| 3/4 | 2268 | 4536 | 9072 | 4536 | 9072 | 18144 | 6804 | 13608 | 27216 |
| 5/6 | 2520 | 5040 | 10080 | 5040 | 10080 | 20160 | 7560 | 15120 | 30240 |
| 7/8 | 2646 | 5292 | 10584 | 5292 | 10584 | 21168 | 7938 | 15876 | 31752 |

Optionally, the values can be calculated from product of the code rate, the number of data carriers per OFDM symbol, and the number of bits per carrier:

DATA_BITS_PER_SYMBOL=DATA_CARRIERS_PER_SYMBOL×BITS_PER_CARRIER×CODE_RATE, where DATA_BITS_PER_SYMBOL is 1512, 3024, or 6048, for 2 k, 4 k, or 8 k symbol sizes, respectively, and BITS_PER_CARRIER is 2, 4, or 6 for QPSK, 16-QAM, and 64-QAM respectively. If hierarchical modulation is used, the number of bits per subset has to be used (either 2 or 4).

If the number of bits contained in the fraction of the overlapping packet is smaller than a predefined number, it can be meaningful to additionally ignore the next complete MPEG-TS packet. In this case, an additional 204×8=1632 bits have to be ignored, i.e., 1632 has to be added to the number of bits contained in the fraction of the overlapping packet. The reason for ignoring a complete packet if the number of bits that would be ignored otherwise is smaller than a predefined number is as follows: When the first demodulated OFDM symbol is passed to the outer receiver 17, the Viterbi processor 10 needs some bits to find the maximum likely path. For the first demodulated symbol, the Viterbi processor 10 has no history to rely on. Thus, the first bits coming out of the Viterbi processor 10 may be erroneous. In order not to falsify any packet error statistics obtained by error counters in the Reed-Solomon decoder 12, it can be advantageous to define a minimum number of bits to be at first ignored after the Viterbi processor 10. This minimum number equals the number of bits needed for convergence of the Viterbi processor 10. The pre-defined number should be set to this minimum number, but may also be a little larger.

The following Table 2 lists the calculated on-times for a DVB-H receiver for 8 MHz channels with 8 k FFT modes. It is assumed that the entire DVB-T channel is used for DVB-H transmission and that during the burst transmission, only data for a particular DVB-H channel are present. The DVB-H net rate is assumed to be 384 kbps with a burst interval of 5 seconds. The overhead for acquisition is assumed to be 8 symbols plus half a super frame.

TABLE 2

DVB-H receive durations incl. overhead using a conventional DVB-T receiver
DVB-H receive durations, 8 MHz Channel, 5 sec burst interval, 384 kbps,
acquisition overhead 144 symbols

| Modulation | Code rate | Δ/TU = 1/4 | Δ/TU = 1/8 | Δ/TU = 1/16 | Δ/TU = 1/32 |
|---|---|---|---|---|---|
| QPSK | 1/2 | 547 ms | 492 ms | 465 ms | 451 ms |
| QPSK | 2/3 | 450 ms | 406 ms | 383 ms | 372 ms |
| QPSK | 3/4 | 419 ms | 377 ms | 356 ms | 345 ms |
| QPSK | 5/6 | 393 ms | 353 ms | 334 ms | 324 ms |
| QPSK | 7/8 | 382 ms | 343 ms | 324 ms | 315 ms |
| 16-QAM | 1/2 | 354 ms | 319 ms | 301 ms | 292 ms |
| 16-QAM | 2/3 | 306 ms | 275 ms | 260 ms | 252 ms |
| 16-QAM | 3/4 | 290 ms | 261 ms | 246 ms | 239 ms |
| 16-QAM | 5/6 | 277 ms | 249 ms | 235 ms | 229 ms |
| 16-QAM | 7/8 | 271 ms | 244 ms | 231 ms | 224 ms |
| 64-QAM | 1/2 | 290 ms | 261 ms | 246 ms | 239 ms |
| 64-QAM | 2/3 | 258 ms | 232 ms | 219 ms | 213 ms |
| 64-QAM | 3/4 | 247 ms | 222 ms | 210 ms | 204 ms |
| 64-QAM | 5/6 | 238 ms | 215 ms | 203 ms | 197 ms |
| 64-QAM | 7/8 | 235 ms | 211 ms | 200 ms | 194 ms |
| Δ/TU | | 0.25 | 0.13 | 0.06 | 0.03 |
| FFT length | 8192 | | | | |
| Ts | | 1,120 μs | 1,008 μs | 952 μs | 924 μs |
| Overhead | 144 syms | 161 ms | 145 ms | 137 ms | 133 ms |

It can be seen that the overhead introduced by the acquisition is more than 50% of the entire on-time for modes above (in the sense of data rate) 16-QAM 2/3.

In contrast to the on-times listed in Table 2, if the acquisition overhead can be reduced to say 8 symbols, the on times of the receiver can be reduced significantly. The resulting calculated on-times are tabulated in Table 3.

TABLE 3

DVB-H receive durations incl. overhead using a DVB-T receiver with the invention
DVB-H receive durations, 8 MHz Channel, 5 sec burst interval, 384 kbps,
acquisition overhead 8 symbols

| Modulation | Code rate | $\Delta$/TU = 1/4 | $\Delta$/TU = 1/8 | $\Delta$/TU = 1/16 | $\Delta$/TU = 1/32 |
|---|---|---|---|---|---|
| QPSK | 1/2 | 395 ms | 355 ms | 336 ms | 326 ms |
| QPSK | 2/3 | 298 ms | 269 ms | 253 ms | 246 ms |
| QPSK | 3/4 | 266 ms | 240 ms | 226 ms | 220 ms |
| QPSK | 5/6 | 241 ms | 216 ms | 204 ms | 198 ms |
| QPSK | 7/8 | 229 ms | 206 ms | 195 ms | 189 ms |
| 16-QAM | 1/2 | 202 ms | 182 ms | 172 ms | 167 ms |
| 16-QAM | 2/3 | 154 ms | 138 ms | 131 ms | 127 ms |
| 16-QAM | 3/4 | 138 ms | 124 ms | 117 ms | 113 ms |
| 16-QAM | 5/6 | 125 ms | 112 ms | 106 ms | 103 ms |
| 16-QAM | 7/8 | 119 ms | 107 ms | 101 ms | 98 ms |
| 64-QAM | 1/2 | 138 ms | 124 ms | 117 ms | 113 ms |
| 64-QAM | 2/3 | 105 ms | 95 ms | 90 ms | 87 ms |
| 64-QAM | 3/4 | 95 ms | 85 ms | 80 ms | 78 ms |
| 64-QAM | 5/6 | 86 ms | 78 ms | 73 ms | 71 ms |
| 64-QAM | 7/8 | 82 ms | 74 ms | 70 ms | 68 ms |
| $\Delta$/TU | | 0.25 | 0.13 | 0.06 | 0.03 |
| FFT length | 8192 | | | | |
| Ts | | 1,120 µs | 1,008 µs | 952 µs | 924 µs |
| Overhead | 8 syms | 9 ms | 8 ms | 8 ms | 7 ms |

The significance can be seen by comparing e.g. the on-time durations for 16-QAM rate ¾ mode for which the average on-time of the DVB-H receiver using the invention is already less than 50% of the on-time of the DVB-H receiver built around a conventional DVB-T receiver.

Since most of the receiver power consumption is burned in the RF front-end and baseband signal processor, the relative reduction in on-time almost directly translates into the same relative reduction of power consumption. Assuming that the total system power consumption is equally distributed between the physical layer and source decoder, the impact on the total system power consumption is significant.

LIST OF REFERENCE NUMERALS

1 receiver
2 RF module
3 DVB-T baseband receiver
4 DVB-H protocol processor
5 clock
6 sleep clock
7 channel decoding logic
8 deinterleaver
9 depuncturer block
10 convolutional deinterleaver, Viterbi processor
11 outer deinterleaver, Forney deinterleaver
12 Reed Solomon decoder
13 descrambler
14 sample-rate-converter (SRC)
15 Fast Fourier Transformation (FFT)
16 channel estimator
17 outer receiver

The invention claimed is:

1. Method for reception of Digital Video Broadcasting-Handheld (DVB-H) signals wherein a MPEG Transport Stream (MPEG TS) is grouped into packets belonging to a certain IP data stream and forming bursts in time slices, the MPEG-TS is modulated into Orthogonal Frequency Division Modulation (OFDM) symbols, these symbols are grouped in frames, the frames themselves are grouped in superframes and symbols, frames and superframes are provided with numbers, whereas a transmitter does not change the transmission parameters (FFT mode, guard interval, code rate, modulation format) between successive bursts and a receiver is notified about a relative time from a first burst to transmission of the next burst and the receiver is switched off between the first and the next burst comprising:

accurately calculating a receive time of the next burst from the DVB-H delta-t time received in the first burst;
setting a wake up timer and powering down the receiver;
powering up the receiver for reception of the next burst at the superframe boundary;
executing signal acquisition;
calculating the symbol number and frame number of the first symbol that contains relevant data to be modulated within the actual superframe;
calculating the number of bits to be discarded from the MPEG-TS to align with a boundary of a MPEG-TS-packet;
discarding the bits; and
starting demodulation at the boundary of the MPEG-TS-packet;
and wherein a Digital Video Broadcasting-Terrestrial (DVB-T) receiver skips:
detection of a channel bandwidth selected from one of 8, 7, 6, and 5 MHz;
detection of a guard interval duration;
detection of a FFT mode selected from one of 8 k, 4 k and 2 k;
detection of a modulation format;
detection of a code rate;
detection of hierarchical transmission; and
detection of a frame and super frame boundaries.

2. A Digital Video Broadcasting-Handheld (DVB-H) receiver, configured to maintain an accurate course symbol timing within the symbol with an accuracy better than 25 ppm, the DVB-H receiver comprising: a Digital Video Broadcasting-Terrestrial (DVB-T) baseband receiver, an analog-to-digital converter, a clock, and a protocol processor, wherein the DVB-T receiver is configured to skip:
detection of a channel bandwidth selected from one of 8, 7, 6, and 5 MHz;
detection of a guard interval duration, detection of a FFT mode selected from one of 8 k, 4 k and 2 k,
detection of a modulation format,
detection of a code rate,
detection of hierarchical transmission, and
detection of a frame and super frame boundaries.

3. The DVB-H receiver according to claim 2 wherein the receiver has the ability is configured to start demodulation at a timing instant given by the protocol processor.

4. The DVB-H receiver according to claim 2 wherein the protocol processor calculates a timing instance for demodulation start and/or acquisition or synchronization start and the number of bits to be discarded.

5. A method for reception of Digital Video Broadcasting-Handheld (DVB-H) signals using a Digital Video Broadcasting-Terrestrial (DVB-T) receiver comprising:
grouping packets of an MPEG Transport Stream (MPEG TS) belonging to an IP data stream;
forming bursts in time slices;
modulating an MPEG-TS into Orthogonal Frequency Division Modulation (OFDM) symbols;
grouping the symbols in frames;
grouping the frames in superframes and symbols;
identifying the frames and superframes;
transmitting bursts, on a transmitter that does not change the transmission parameters (FFT mode, guard interval, code rate, modulation format);
notifying a receiver about a relative time from a first burst to a second burst;
switching the receiver off between successive bursts;
calculating a receive time of successive bursts from a DVB-H delta-t time received in the previous burst;
setting a wake up timer;
powering down the receiver;
powering up the receiver to receive the successive burst at the superframe boundary;
acquiring a signal;
calculating the symbol identity and frame number of the first symbol that contains relevant data to be modulated within the superframe;
calculating the number of bits to be discarded from the MPEG-TS to align with a boundary of a MPEG-TS packet;
discarding the bits; and
starting demodulation at the boundary of the MPEG-TS;
wherein the DVB-T receiver skips detection of:
a channel bandwidth selected from one of 8, 7, 6, and 5 MHz;
a guard interval duration;
a FFT mode selected from one of 8 k, 4 k, and 2 k;
a modulation format;
a code rate;
hierarchical transmission;
frame boundaries; and
super frame boundaries.

6. A Digital Video Broadcasting-Handheld (DVB-H) receiver system comprising:
an RF module, a Digital Video Broadcasting-Terrestrial (DVB-T) baseband receiver, an analog-to-digital converter, a clock and a protocol processor;
wherein the protocol processor is configured to maintain accurate course symbol timing within the symbol; and
wherein the DVB-T receiver is configured to skip detection of:
a channel bandwidth selected from one of 8, 7, 6 and 5 MHz;
a guard interval duration;
a FFT mode selected from one of 8 k, 4 k, and 2 k;
a modulation format;
a code rate;
a hierarchical transmission;
a frame boundaries; and
super frame boundaries.

7. The DVB-H system of claim 6 wherein the receiver is configured to demodulate when instructed by the processor.

8. The DVB-H system of claim 6 wherein the protocol processor is configured to calculate a timing instance for demodulation start.

9. The DVB-H system of claim 6 wherein the protocol processor is configured to calculate acquisition or synchronization start.

10. The DVB-H system of claim 6 wherein the protocol processor is configured to calculate the number of bits to be discarded.

\* \* \* \* \*

UNITED STATES PATENT AND TRADEMARK OFFICE
CERTIFICATE OF CORRECTION

| | |
|---|---|
| PATENT NO. | : 8,279,943 B2 |
| APPLICATION NO. | : 11/995984 |
| DATED | : October 2, 2012 |
| INVENTOR(S) | : Volker Aue |

It is certified that error appears in the above-identified patent and that said Letters Patent is hereby corrected as shown below:

Column 11, Line 8, Claim 3, delete "has the ability" after the word "receiver"

Signed and Sealed this
Twenty-fifth Day of December, 2012

David J. Kappos
*Director of the United States Patent and Trademark Office*